(12) United States Patent
Desbois et al.

(10) Patent No.: US 9,080,050 B2
(45) Date of Patent: Jul. 14, 2015

(54) USE OF VINYLAROMATIC-DIENE COPOLYMERS IN LACTAM COMPOSITIONS

(75) Inventors: Philippe Desbois, Edingen-Neckarhausen (DE); Konrad Knoll, Mannheim (DE); Anna Karina Möller, Darmstadt (DE)

(73) Assignee: BASF SE, Ludwigshafen (DE)

( * ) Notice: Subject to any disclaimer, the term of this patent is extended or adjusted under 35 U.S.C. 154(b) by 439 days.

(21) Appl. No.: 13/408,298

(22) Filed: Feb. 29, 2012

(65) Prior Publication Data

US 2012/0225995 A1    Sep. 6, 2012

Related U.S. Application Data

(60) Provisional application No. 61/448,212, filed on Mar. 2, 2011.

(51) Int. Cl.
*C08L 77/02* (2006.01)
*C08L 53/02* (2006.01)
*C08G 69/18* (2006.01)

(52) U.S. Cl.
CPC ............... *C08L 77/02* (2013.01); *C08G 69/18* (2013.01); *C08L 53/02* (2013.01)

(58) Field of Classification Search
CPC .......... C08L 77/02; C08L 53/02; C08G 69/18
USPC .................................... 524/534, 571; 525/98
See application file for complete search history.

(56) References Cited

U.S. PATENT DOCUMENTS

| | | | |
|---|---|---|---|
| 2,512,606 A | 6/1950 | Bolton et al. | |
| 3,298,977 A | 1/1967 | Robertson et al. | |
| 3,393,210 A | 7/1968 | Speck | |
| 6,031,053 A | 2/2000 | Knoll et al. | |
| 6,197,889 B1 | 3/2001 | Knoll et al. | |
| 2010/0113648 A1* | 5/2010 | Niessner et al. ............... | 523/351 |
| 2011/0003928 A1 | 1/2011 | Shimizu et al. | |

FOREIGN PATENT DOCUMENTS

| | | |
|---|---|---|
| CN | 1380349 A | 11/2002 |
| DE | 4420952 A1 | 12/1995 |
| EP | 0459199 | * 5/1991 |
| EP | 0459199 A1 | 12/1991 |
| EP | 0766706 A1 | 4/1997 |
| EP | 0859803 A1 | 8/1998 |

OTHER PUBLICATIONS

Van Der Loos, J., et al., "Properties and Morphology of Impact-Modified RIM Nylon", American Chemical Society, vol. 270, (1985), pp. 181-191.
International Search Report from International Application No. PCT/EP2012/053485 dated Apr. 25, 2013.

* cited by examiner

*Primary Examiner* — James J Seidleck
*Assistant Examiner* — Deve E Valdez
(74) *Attorney, Agent, or Firm* — Drinker Biddle & Reath LLP

(57) ABSTRACT

A lactam composition which comprises the following components:
  from 3 to 25% by weight of a random vinylaromatic-diene copolymer (A), where the random vinylaromatic-diene copolymer is composed of at least one block (S) which forms a hard phase and which is composed of vinylaromatic monomers, and of at least one random block (S/B) which forms a soft phase and which has vinylaromatic monomers and diene monomers,
  from 75 to 97% by weight of at least one lactam component (B), and also optionally reinforcing materials and/or additives
has improved viscosity in the melt and can be used for producing polyamide moldings.

15 Claims, No Drawings

USE OF VINYLAROMATIC-DIENE COPOLYMERS IN LACTAM COMPOSITIONS

CROSS-REFERENCE TO RELATED APPLICATIONS

This application claims benefit (under 35 USC 119(e)) of U.S. Provisional Application 61/448,212, filed Mar. 2, 2011, which is incorporated by reference.

BACKGROUND OF THE INVENTION

The present invention relates to the use of vinylaromatic-diene copolymers in lactam compositions. The invention also relates to lactam melts which comprise random vinylaromatic-diene copolymers. The invention further relates to the production of lactam melts, and also to use of these, preferably in the field of activated anionic lactam polymerization, e.g. for producing cast polyamides.

Vinylaromatic-diene copolymers of varying structure, an example being styrene-butadiene copolymers, have been known for many years. They can be used as additions for producing various molding compositions. The random vinylaromatic-diene copolymers used in the invention include, in their structure, at least one section which comprises a diene and a vinylaromatic randomly distributed. These copolymers can be produced by processes known from the literature, see by way of example EP-A 0 766 706 and EP-A 0 859 803.

DE-A 44 20 952 describes elastomeric block copolymers which are composed of at least one block A which forms a hard phase made of styrene, and of a block B which forms an elastomeric soft phase and which comprises butadiene, and of at least one elastomeric block B/A comprising styrene and butadiene. The ratio of block A to block B/A here is important.

Various processes for producing polyamides have been known for many years. Typical polyamides are semicrystalline and amorphous polyamide resins with a molar mass of at least 5000 g/mol, these usually being termed nylon. Polyamides of this type are described by way of example in U.S. Pat. Nos. 2,512,606 and 3,393,210.

Polyamides can be produced firstly via condensation of equimolar amounts of a saturated or aromatic dicarboxylic acid with a saturated or aromatic diamine, or else via condensation of ω-aminocarboxylic acids or via polyaddition of corresponding lactams. Typical examples of polyamides are polyhexamethyleneadipamide (nylon-6,6), and also the polyamide polycaprolactam, which is obtained via ring-opening of lactams.

Activated anionic polymerization of lactams for producing polyamides is a process having very sensitive chemistry, and many additives disrupt this process. By way of example, conventional thickeners for adjusting viscosity, e.g. polyacrylamides, are disadvantageous for the polymerization reaction or have low solubility in the lactam melts.

Production of polyamide moldings via activated anionic lactam polymerization is described as early as in 1966 in Kunststoff-Handbuch [Plastics handbook] (volume VI, Polyamide [Polyamides], Carl-Hanser-Verlag, 1966), where other impact modifiers are also added in order to improve the strength of the polyamide moldings. The impact modifiers used are in particular polyalkylene glycols (see J. L. M. van der Loos, ACS Symposium Series 1985, 270, 181-191). There are various types of impact modifiers here, examples being those which interact with the molecular structure of the polymers (e.g. polyalkylene glycols and polyetheramines), and also those which do not interact with the molecular structure of the polymers but instead form a mixture (or a blend) with the polymer.

A SUMMARY OF THE INVENTION

Surprisingly, it has been found that the viscosity of lactam compositions, in particular of lactam melts, can be markedly improved via addition of specific vinylaromatic-diene copolymers (A). This measure generally improves the activated anionic polymerization process, since said addition has no (or only insignificant) disadvantageous effect. The lactam compositions of the invention are also particularly suitable for producing reinforced and filled cast polyamide parts. In particular, this permits incorporation of reinforcement materials (e.g. made of glass, carbon, or aramid) in the form of fibers and/or in the form of mats into the polyamide compositions. The fillers/reinforcing materials sediment in the melt at a suitable rate, permitting good and homogeneous distribution in the moldings and giving improved product properties.

The invention provides lactam compositions, in particular lactam melts with improved viscosity in the melt, where these comprise the following components:
 a) at least one vinylaromatic-diene copolymer (A),
 b) at least one lactam component (B), in particular ε-caprolactam,
 c) optionally one or more fillers and/or reinforcing materials (C),
 d) optionally one or more additives (Z).

A DETAILED DESCRIPTION OF THE INVENTION

These lactam compositions also have particularly advantageous density properties, where these naturally also depend on the nature and the extent of the filler and/or reinforcing material used. Balancing of the density properties of lactam composition and reinforcing material (e.g. aramid fiber mat) is important for the mechanical properties of the molding.

The invention in particular provides a lactam composition (with improved or increased viscosity in the melt) which comprises the following components:
 a) from 3 to 25% by weight, preferably from 5 to 20% by weight (based on the entirety of components A and B) of at least one random vinylaromatic-diene copolymer (A), where the random vinylaromatic-diene copolymer (A) is composed of at least one block (S) which forms a hard phase and which is composed of vinylaromatic monomers, and of at least one random block (S/B) which forms a soft phase and which has vinylaromatic monomers and diene monomers,
 b) from 75 to 97% by weight, preferably from 80 to 95% by weight (based on the entirety of components A and B) of at least one lactam component (B), in particular ε-caprolactam,
 c) optionally one or more fillers and/or reinforcing materials (C), and also
 d) optionally one or more additives (Z).

The invention in particular provides a lactam composition wherein the random vinylaromatic-diene copolymer (A) firstly uses the monomers styrene, alpha-methylstyrene, m-methylstyrene, and/or p-methylstyrene, and secondly uses the monomers butadiene, isoprene, and/or 2,3-dimethylbutadiene.

The invention in particular provides a lactam composition wherein the random vinylaromatic-diene copolymer (A) is composed of styrene and butadiene.

The invention in particular provides a lactam composition wherein, in the random vinylaromatic-diene copolymer (A), the molar mass of the block S/B is from 10 000 to 250 000, and the molar mass of the block S (or of the blocks S) is from 5000 to 200 000 [g/mol], and the total molar mass of the vinylaromatic-diene copolymer (A) is in the range from 80 000 to 300 000 [g/mol].

The invention in particular provides a lactam composition wherein the lactam component used comprises ε-caprolactam, piperidone, pyrrolidone, laurolactam, or a mixture of two or more of the abovementioned monomers.

The invention in particular provides a lactam composition, which comprises an amount of from 5 to 80% by weight (based on the entirety of all of components A, B, C, and Z) of fillers and/or reinforcing materials (C).

The invention in particular provides a lactam composition, which comprises an amount of from 1 to 10% by weight (based on the entirety of all of components A, B, C, and Z) of additives (Z).

The invention in particular provides a lactam composition, the viscosity of which in the melt at 140° C. is from 10 to 1000 mPas. The invention in particular provides a lactam composition, the viscosity of which in the melt at 140° C. is from 10 to 500 mPas. The density of the lactam compositions (without fillers and reinforcing materials) is by way of example from 1.06 to 1.20 g/ml.

The invention also provides the use of a random vinylaromatic-diene copolymer (A) which is composed of at least one block (S) which forms a hard phase and which is composed of vinylaromatic monomers, and of at least one random block (S/B) which forms a soft phase and which has vinylaromatic monomers and diene monomers, for producing a lactam melt.

The invention also provides the use of a lactam composition as described above for producing polyamides via activated anionic polymerization (cast polyamides), optionally with use of a catalyst (K) and/or of an activator (V).

The invention in particular provides a polyamide item, in particular cast polyamide item, produced from a lactam composition according to any of claims 1 to 9, optionally with use of a catalyst (K) and/or of an activator (V).

The invention further provides a process for producing polyamides with use of a lactam composition as described above, which comprises converting the lactam composition in molten form, optionally in the presence of a catalyst (K) and/or of an activator (V), into cast polyamides by the process of activated anionic polymerization.

The present invention further provides the use, for producing polyamides, of the lactam composition that gives a lactam melt, in particular by way of the process of activated anionic polymerization, in particular for producing reinforced and/or filled cast polyamide parts. The invention also provides a process for producing said polyamides, and also the polyamides and, respectively, polyamide items and, respectively, polyamide parts produced via use of the lactam composition.

The random vinylaromatic-diene copolymers (A) used in the invention are in particular composed of at least one block A which forms a hard phase and which is composed of vinylaromatic monomers (such as styrene), and of at least one (elastomeric) block (B/A) which forms a soft phase and which has vinylaromatic monomers (such as styrene), and also a diene (such as butadiene). The glass transition temperature $T_g$ of the block A here is above 25° C., and the glass transition temperature $T_g$ of the block B/A is below 25° C. The phase volume ratio of block A to block (B/A) has been selected in such a way that the proportion of the hard phase, based on the entire copolymer, is from 10 to 40% by volume, and the proportion by weight of the diene is less than 50% by weight. The relative proportion of 1,2-linkages of the polydiene, based on the entirety of 1,2- and 1,4-cis/trans linkages is generally intended to be below 15%.

The random vinylaromatic-diene copolymers (A) used in the invention preferably comprise, as vinylaromatic monomer component, styrene, alpha-methylstyrene, and/or vinyltoluene. The random vinylaromatic-diene copolymers used in the invention preferably comprise, as diene component, 1,3-butadiene and/or isoprene. The molar mass of the block B/A in the random vinylaromatic-diene copolymers (A) is preferably from 10 000 to 250 000, and the molar mass of the block A (or of the blocks A) therein is preferably from 5000 to 200 000 [g/mol].

The total molar mass of the vinylaromatic-diene copolymer used in the invention is often in the range from 80 000 to 300 000 [g/mol], in particular from 120 000 to 290 000 [g/mol].

The monomer composition of the random vinylaromatic-diene copolymers (A) used in the invention is generally from 25 to 60% by weight of diene, in particular butadiene, and from 75 to 40% by weight of vinylaromatic monomers, in particular styrene. The overall monomer composition is frequently from 75 to 40% by weight of styrene and from 25 to 60% by weight of butadiene.

The proportion of butadiene in the soft block (B/A) of the random vinylaromatic-diene copolymers (A) used in the invention is preferably from 35 to 70%, and the corresponding proportion of styrene is from 65 to 30%, and in particular the soft phase (B/A) here is a random copolymer of styrene and butadiene.

The random vinylaromatic-diene copolymers often have a simple structure as described in EP-A 0 859 803, e.g.

where A here is the vinylaromatic block, in particular a styrene block, and (B/A) is the block randomly composed of diene units and of vinylaromatic units, in particular a random butadiene/styrene block. The index n is a natural number from 1 to 10, for example 1, 2 or 3. However, the structure can also be more complex. A vinylaromatic-diene copolymer often used has the structure A-(B/A)-A, where (B/A) is preferably a randomly structured copolymer of styrene and butadiene. The random vinylaromatic-diene copolymers (A) can have a (relatively large) random block (B/A) and also a plurality (e.g. two) relatively small vinylaromatic blocks A.

The present invention in particular provides the use of random vinylaromatic-diene copolymers (A) which are preferably based on styrene and butadiene.

In another preferred embodiment, the copolymer (A) used comprises from 60 to 70% by weight styrene content, in particular about 65% by weight.

The vinylaromatic-diene copolymer (A) used preferably has at least 70% by weight of "soft phase". The styrene units and butadiene units have random distribution in the soft phase (soft block). Suitable random block copolymers are obtainable by way of example as Styroflex 2G66 (produced by BASF SE, Ludwigshafen).

The random vinylaromatic-diene copolymers (A) are produced by way of example via anionic polymerization in accordance with EP-A 0 859 803, e.g. by means of alkyllithium compounds in a non-polar solvent, where the polymerization of at least one soft phase (B/A) takes place in the presence of, for example, a soluble potassium salt, e.g. potassium 2,3-dimethyl-3-pentanolate, potassium 3,7-dimethyl-3-octanolate, or potassium 3-ethyl-3-pentanolate.

The abovementioned random vinylaromatic-diene copolymers (A) can be dissolved in lactam component (B), e.g. in the lactam melt, and can function here as particularly suitable impact modifiers.

These lactam compositions of the invention can also comprise further additional components, such as rubbers and/or fillers and/or reinforcing materials (C) (in particular fibrous or particulate fillers), and also further additions (Z).

The invention also provides the use of lactam melts which comprise at least one random vinylaromatic-diene copolymer (A) in a reaction injection molding (RIM) process for producing cast polyamide moldings, cast polyamide fibers, and cast polyamide foils. The invention also provides the fibers, foils, and moldings thus obtainable.

Particularly suitable lactam components (B) are ε-caprolactam, piperidone, pyrrolidone, laurolactam, and also mixtures of these. In one preferred embodiment of the invention, lactam component (B) used comprises a substance from the group comprising ε-caprolactam, laurolactam, and mixtures of these. It is particularly preferable to use ε-caprolactam.

Lactam component (B) in the compositions, e.g. ε-caprolactam, can be polymerized anionically by known processes. A catalyst (K) and an activator (V) are generally needed for this purpose. There are often also other additions or additives (Z) added, e.g. for impact modification, and these are generally introduced into the lactam melt prior to the polymerization process.

For many application sectors it is moreover desirable to increase the good level of mechanical properties of cast polyamides via the use of fiber-containing reinforcing materials (C), such as glass fibers. The viscosity of the lactam melts used is an important criterion here. These lactam melts with increased, but not excessive, viscosity have particular suitability for short glass fibers, since they slow, or even prevent, the sedimentation thereof. EP-A 0 459 199 describes lactam melts with increased viscosity which comprise dissolved block copolymers and which slow sedimentation of short glass fibers. A disadvantage of these lactam melts is that they are unsuitable for the use of glass fiber textile. When glass fiber textile is used it is desirable that the viscosity of the lactam melts is minimized, since otherwise the glass fiber textile does not become fully saturated and it is impossible to achieve complete filling of the mold in the RIM process.

The random vinylaromatic-diene copolymers used in the invention (having a random soft phase) are not described in EP-A 0 459 199. Little has been known hitherto about lactam melts comprising additives, in particular having relatively high additive concentrations, where these are also suitable for producing glass fiber textile-reinforced cast polyamide.

Random vinylaromatic-diene copolymers (A) as described above have hitherto been used for modifying styrene polymers. In a mixture with a polystyrene it is possible by way of example to achieve a significant improvement in the toughness and the stress-cracking-resistance of moldings.

The lactam compositions can be produced from the corresponding lactam components (B) and the vinylaromatic-diene copolymers (A) via mixing of the components, and give lactam melts with improved viscosity. These melts are preferably used in the field of activated anionic lactam polymerization (e.g. for cast polyamides).

In the invention, an amount of from 2 to 30% by weight, in particular from 3 to 25% by weight of the vinylaromatic-diene copolymers (A), based on the entire composition, is mixed with an amount of from 70 to 78% by weight, in particular from 75 to 97% by weight, of lactam component (B). Further components can optionally be added (an example of the amount of these being from 0 to 20% by weight).

The vinylaromatic-diene copolymers (A) that can be used generally comprise from 40 to 75% by weight of vinylaromatic units and from 25 to 60% by weight of diene units. Preferred vinylaromatic unit is styrene, and preferred diene unit is butadiene.

The lactam melts of increased viscosity are particularly suitable for absorbing reinforcing materials and fillers (C) and for producing filled cast polyamides. They are moreover also suitable for use as filler- or fiber-containing lactam melts in a process for producing polyamides.

The cast polyamide parts of the invention, e.g. produced from ε-caprolactam, have good mechanical properties. Because they have higher crystallinity than standard injection moldings, and also higher molar masses, numerous mechanical property values are better than those of polyamides produced via polycondensation. Cast polyamide comprising a vinylaromatic-diene copolymer (A) is an attractive material.

The various fillers (C) and additives (Z) which are intended to be present in the molding can generally be introduced into the lactam melt prior to the polymerization process.

In one preferred embodiment, the lactam composition comprises at least one filler or reinforcing material (C). Fillers and/or reinforcing materials (C) that can be used are organic or inorganic fillers and/or organic or inorganic reinforcing materials (F). By way of example, it is possible to use inorganic fillers, such as kaolin, chalk, wollastonite, talc, calcium carbonate, silicates, titanium dioxide, zinc oxide, graphite, graphene, glass particles, e.g. glass beads, nanoscale filler, e.g. carbon nanotubes, carbon black, phyllosilicates, nanoscale phyllosilicates, nanoscale aluminum oxide ($Al_2O_3$), nanoscale titanium dioxide ($TiO_2$), and nanoscale silicon dioxide ($SiO_2$).

Preference is further given to the use of fibrous materials as reinforcing materials.

The fillers and/or reinforcing materials (C) are generally selected from the group comprising minerals of conventional grain size for thermoplastics applications, examples being kaolin, chalk, wollastonite, or talc. Important fibrous materials are carbon fibers, aramid fibers, and glass fibers, and also corresponding textile structures (textiles and laid scrims) made of unidirectional fibers, preferably glass fibers and carbon fibers.

The lactam compositions can use one or else a plurality of fibrous materials selected from known inorganic reinforcing fibers, such as boron fibers, glass fibers, carbon fibers, silica fibers, ceramic fibers, and basalt fibers; organic reinforcing fibers, such as aramid fibers, polyester fibers, nylon fibers, polyethylene fibers; and natural fibers, such as wood fibers, flax fibers, hemp fibers, and sisal fibers. It is particularly preferable to use glass fibers, in particular chopped glass fibers, or to use carbon fibers, aramid fibers, boron fibers, metal fibers, or potassium titanate fibers. The abovementioned fibers can be used in the form of short fibers or long fibers, or in the form of mixture of short and long fibers. The average fiber length of the short fibers here is preferably in the range from 0.1 to 1 mm. Preference is further given to fibers with an average fiber length in the range from 0.5 to 1 mm. The long fibers used preferably have an average fiber length above 1 mm, preferably in the range from 1 to 50 mm. Preference is also given to use of mats made of the abovementioned organic or inorganic fibers.

In particular, it is also possible to use mixtures of the abovementioned fillers and/or reinforcing materials (C).

Glass fibers and/or glass fiber mats are particularly preferably selected as filler and/or reinforcing material (C).

The lactam composition produced in the process described above preferably comprises from 30 to 90% by weight, in particular from 30 to 80% by weight, preferably from 30 to 70% by weight, based on the entire composition, of at least one filler and/or reinforcing material (C).

In one preferred embodiment, the lactam composition can comprise further additives (Z). The amount comprised in the entire composition of the additives (Z) is preferably from 0 to 10% by weight, preferably from 0 to 5% by weight, particularly preferably from 0.1 to 4% by weight. Examples of additives (Z) that can be added are stabilizers, such as copper salts, dyes, antistatic agents, filler oils, surface improvers, desiccants, mold-release aids, release agents, antioxidants, light stabilizers, PVC stabilizers, lubricants, flame retardants, blowing agents, impact modifiers, and nucleation aids.

It is preferable that the composition comprises, as additive (Z), a further impact modifier, in particular a polydiene polymer (e.g. polybutadiene, polyisoprene) comprising anhydride and/or epoxy groups. The polydiene polymer in particular has a glass transition temperature below 0° C., preferably below −10° C., particularly preferably below −20° C. The polydiene polymer can be based on a polydiene copolymer with polyacrylates, with polyethylene acrylates, and/or with polysiloxanes, and can be produced by the familiar processes (e.g. emulsion polymerization, suspension polymerization, solution polymerization, gas-phase polymerization).

The optional addition of fillers and/or reinforcing materials (C) and of the further additives (Z) can in principle take place at any step in the process for producing the composition.

The present invention further provides the use of a composition obtained (or obtainable) via a process of the invention as described above for producing a polyamide molding.

The amount used of polymer component A is preferably such that the viscosity of the composition (at 140° C.) is specifically from 8 to 1000 mPas, always without fillers/reinforcing materials (C). Viscosities of at least about 10 to 500 mPa·s, varying with the nature and amount of the materials, are generally adequate to achieve an adequately stable dispersion of the fillers and reinforcing materials (C), e.g. of the glass fibers. On the other hand, the viscosity of the lactam melt (without fillers/reinforcing materials) should preferably not be higher than about 1200 mPas, particularly preferably 1000 mPas, since otherwise processability can be impaired.

To produce the lactam compositions and, respectively, lactam melts of the invention, by way of example, the lactams B) can be mixed with polymer component (A) and with the fillers (C) and melted, or else component (A) or a solution of the same in volatile solvents can be mixed with molten lactams (B), optionally with subsequent removal of the solvent. It is also possible to use concentrates (masterbatches) of component (A), for example in caprolactam.

The cast polyamide parts of the invention, optionally reinforced and/or filled, are in principle produced by the conventional processes, but preferably by anionically activated lactam polymerization. The production of cast polyamide parts starting from low-viscosity lactam melts and catalysts, and also activators, is known (see Vieweg, Müller; Kunststoff-Handbuch [Plastics handbook], volume VI, Carl Hanser Verlag, Munich 1966). In comparison with polyurethane RIM systems, the technology of the process is simpler since, for example, the very-low-viscosity lactam melts permit, as an alternative to reaction injection molding technology, conveying at atmospheric pressure with use of simple pumps.

For many application sectors it is desirable to achieve a further increase in the good level of mechanical properties of cast polyamide parts, e.g. hardness, stiffness, and strength, and also creep modulus. This can be achieved by adding the reinforcing materials or fillers (C) described. The viscosity of the lactam melts of the invention can be highly advantageous since, despite the difference in density, by way of example glass fibers do not sediment rapidly. This permits production of glass-fiber-reinforced cast polyamide by a conventional route. The invention provides a simple method of improving markedly the viscosity of lactam melts.

Another object of the present invention has been achieved in that novel polymeric components are provided for increasing the impact resistance of polyamide moldings (in particular with glass fiber textile) without any marked increase in the viscosity of the underlying lactam melt, and/or without any effect on the rate of the anionic polymerization process.

It has been found that the specific vinylaromatic-diene copolymers (A) are suitable for use in the reaction injection molding (RIM) process since the use of these random vinylaromatic-diene copolymers does not disrupt the anionic polymerization process, and there is no, or no significant, adverse effect on the glass transition temperature (Tg) of the resultant polymer blend.

In particular, the polystyrene content in the random vinylaromatic-diene copolymers (A) leads to greater compatibility with the polyamide component, and inhibits phase separation, even at relatively high vinylaromatic-diene copolymer contents.

In the case of a styrene-butadiene copolymer (A), the amount of this component often added to the composition is from 3 to 25% by weight, preferably from 5 to 20% by weight, and this component dissolves in lactam component (B), and can increase the toughness of the molding. Because of the styrene- and butadiene-based structure, the water content and water absorption of the random vinylaromatic-diene copolymers is negligible and does not disrupt the anionic polymerization process.

Anionic polymerization of lactams can take place in a reaction casting process or reaction injection molding process, where a catalyst (K) and further additives are added to the lactam melt during the polymerization process. The defined amounts of catalyst (K), of activator (A), and of other additives can be incorporated by stirring into the molten lactam composition (e.g. based on caprolactam and Styroflex). A simple process is thus provided which leads to cast polyamide moldings with improved quality.

Examples of components suitable as activator component (V) in the polymerization process are:

aliphatic diisocyanates, such as butylene diisocyanate, hexamethylene diisocyanate, octamethylene diisocyanate, decamethylene diisocyanate, undodecamethylene diisocyanate, dodecamethylene diisocyanate, and also aromatic diisocyanates, such as tolylene diisocyanate, isophorone diisocyanate, methylenebis(phenyl 4-isocyanate), methylenebis(cyclohexyl 4-isocyanate), and also polyisocyanates, such as isocyanurates of hexamethylene diisocyanate, Basonat® HI 100 from BASF SE, allophanates, such as ethyl allophanate, and mixtures of these. Preference is given to hexamethyllene diisocyanate and isophorone diisocyanate, and particular preference is given to hexamethylene diisocyanate. The diisocyanates can be replaced by monoisocyanates. As an alternative, diacyl halides are also suitable as activator component, examples being butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, and also aromatic diacyl halides such as tolylenedioyl chloride, tolylenemethylenedioyl bromide, isophoronedioyl chloride, isophoronedioyl bromide, 4,4'-methylenebis(phenyloyl chloride), 4,4'-methylenebis(phenyloyl bromide), 4,4'-methylenebis(cyclohexyloyl chloride), 4,4'-methylenebis(cyclohexyloyl bromide), or a mixture of these, preferably hexamethylenedioyl chloride, hexamethylenedioyl bromide, or a mixture of these, particularly preferably hexamethylenedioyl chloride. The diacyl halides can be replaced by monoacyl halides.

A suitable catalyst component (K) for the polymerization process is inter alia:

sodium caprolactamate, potassium caprolactamate, magnesium bromide caprolactamate, magnesium chloride caprolactamate, magnesium biscaprolactamate, sodium hydrides, sodium metal, sodium hydroxide, sodium methoxide, sodium ethoxide, sodium propoxide, sodium butoxide, potassium hydride, potassium metal, potassium hydroxide, potassium methoxide, potassium ethoxide, potassium propoxide, or potassium butoxide. It is preferable that the catalyst component for the process of the invention is selected from the group comprising sodium hydrides, sodium metal, and sodium caprolactamate, and particular preference is given here to sodium caprolactamate (e.g. the commercially available product Bruggolen® C 10, a solution of 18% by weight of sodium caprolactamate in caprolactam).

The following components can be used as solvents (L) in the polymerization process:

dimethyl sulfoxide, methyl chloride, methylene chloride, dioxane, tetrahydrofuran, acetonitrile, tetrahydropyran, N-methylpyrrolidones, N-ethylpyrrolidones, dimethylformamide, methanol, ethanol, n-propanol, isopropanol, and mixtures of these. Preference is given to dimethyl sulfoxide, methyl chloride, methylene chloride, tetrahydrofuran, and mixtures of these, and particular preference is given to dimethyl sulfoxide, methylene chloride and mixtures of these.

The molar ratio of activator components (V) to the lactam B can be varied widely, but is generally from 0.01:1 to 100:1, preferably from 0.1:1 to 10:1, particularly preferably from 0.5:1 to 1.5:1.

The molar ratio of the solvent (L) to activator component (V) can be varied widely, that is generally from 100:1 to 0:1, preferably from 50:1 to 0.5:1, particularly preferably from 25:1 to 1:1.

The molar ratio of the solvent (L) to the lactam (B) can be varied widely, that is generally from 100:1 to 0:1, preferably from 50:1 to 0.5:1, particularly preferably from 10:1 to 1:1.

The molar ratio of lactam (B) to the catalyst (K) can be varied widely, that is generally from 1:1 to 10 000:1, preferably from 10:1 to 1000:1, particularly preferably from 100:1 to 3000:1.

The molar ratio of activator (V) to the catalyst (K) can be varied widely, that is generally from 10:1 to 1:100, preferably from 5:1 to 1:10, particularly preferably from 2:1 to 1:5.

In one preferred embodiment of the invention, one copolymer component (A) and one lactam component (B) are used. In another embodiment of the process of the invention, specifically one catalyst (K) is used. In another embodiment of the process of the invention, specifically one initiator (I) is used.

In one particularly preferred embodiment of the process of the invention, specifically one lactam (B), in particular caprolactam, specifically one catalyst (K), and specifically one initiator (I) are used.

The process of the invention can inter alia take the form of cast polymerization process, spray polymerization process, reactive extrusion process, dispersion polymerization process, or what is known as "rotomolding".

EXAMPLES

Examples are used below for further explanation of the invention.

Examples 1, 2, and 3

Production of Lactam Melts and Viscosity Measurements 100 grams of ε-caprolactam were mixed with various amounts (5 or 10 or 20% by weight) of a commercially available random styrene-butadiene copolymer (65% by weight of styrene, 35% by weight of butadiene; Styroflex 2G66, BASF SE), heated under $N_2$ to 140° C., and stirred until the copolymer had dissolved completely (from 1.5 to 2.5 h). Styroflex 2G66 is a random vinylaromatic-diene copolymer composed of two blocks (S) which form a hard phase and are composed of styrene monomers, and of a random block (S/B) which forms a soft phase and which comprises styrene and butadiene monomers.

A Physica MCR301 rotary viscometer was then used to determine the viscosities of the compositions at temperatures of 110° C. and 140° C.

Table 1 collates the values measured.

TABLE 1

| Example | Polymer | 110° C. viscosity [mPa · s] | 140° C. viscosity [mPa · s] |
| --- | --- | --- | --- |
| 1 | 5% Styroflex 2G66 | 20 | 10 |
| 2 | 10% Styroflex 2G66 | 110 | 50 |
| 3 | 20% Styroflex 2G66 | 1400 | 480 |
| 5 | 5% SB diblock copolymer | 60 | 30 |
| 6 | 10% SB diblock copolymer | 1530 | 1000 |
| 7 | 20% SB diblock copolymer | 4200 | 2100 |

Comparative examples 5, 6, and 7 use various amounts of a styrene-butadiene diblock copolymer (without random block) according to EP-A 0 459 199 (Bayer) under analogous conditions.

The results of the experiments showed that when the random vinylaromatic-diene copolymer of the invention was compared with a comparable vinylaromatic-diene block copolymer it brought about markedly lower viscosities in the lactam melts studied (made of ε-caprolactam). This leads to better processing of the lactam compositions.

Examples 8, 9, 10, 11, and 12

Anionic Polymerization of the Lactam Melts in a Calorimeter

The following polymerization reactions were carried out at 140° C., with stirring, in dry nitrogen in a 50 ml glass calorimeter sealed with a grease-free Teflon stopper and provided with a temperature sensor.

Conventional equipment (Maia DSC200F3 from Netzsch) was used to carry out the DSC measurements. The input weights were in each case about 10 mg, and the heating and cooling rates were 20 K/min.

An amount of 2.0 g of the random styrene-butadiene copolymer (Styroflex 2G66) used in examples 1, 2, and 3 was dissolved, with stirring, within a period of 2.5 hours at 140° C. in 7.4 g of ε-caprolactam under $N_2$.

As an alternative, an amount of 9.4 g of the melt used in examples 1, 2, and 3 was produced from random styrene-butadiene copolymer (Styroflex 2G66) and ε-caprolactam at 140° C. under $N_2$.

The following were then added to the molten mixture: 0.4 gram, i.e. 4% by weight, of the catalyst (K) Brüggolen C10 (18% of sodium caprolactam in caprolactam, Brüggemann KG, Heilbronn) and 0.2 gram, i.e. 2% by weight, of the activator (V) Brüggolen C20 (80% of caprolactam-capped hexamethylene 1,6-diisocyanate in caprolactam, Brüggemann KG, Heilbronn) in the form of solid at 20° C.

Internal temperature was then measured as a function of time over a period of 15 min with the aid of a temperature sensor. The system was then quenched via cooling of the reactor in water (10° C.).

Table 2 shows the polymer compositions obtained as examples 8 to 12, where compositions 8 to 11 comprise a random styrene-butadiene copolymer (Styroflex 2G66) whereas example 12 comprises a styrene-butadiene diblock copolymer (without random block) according to EP-A 0 459 199 (Bayer).

TABLE 2

| Ex. | Amount of SB copolymer (% by wt.) | Monomer (% by wt.) | Cat. (K) C10 (% by wt.) | (V) C20 (% by wt.) | Tmax (° C.) | tmax (s) | Density (g/ml) |
|---|---|---|---|---|---|---|---|
| 8 | — | 94 | 4 | 2 | 186.7 | 78 | 1.131 |
| 9 | 5 | 89 | 4 | 2 | 184.8 | 77 | 1.119 |
| 10 | 10 | 84 | 4 | 2 | 179.6 | 81 | 1.071 |
| 11 | 20 | 74 | 4 | 2 | 176.0 | 122 | 1.065 |
| 12 | 20 (Bayer) | 74 | 4 | 2 | 146.3 | 344 | 1.016 |

Example 12

Comparative Example 2.0 grams, i.e. 20% by weight, of the styrene-butadiene diblock copolymer according to EP-A 0 459 199 (Bayer) used in examples 5, 6, and 7 were dissolved, with stirring, within a period of 1.5 hours at 140° C. in 7.4 g of ε-caprolactam under $N_2$.

The following were then added to the melt: 0.4 gram, i.e. 4% by weight, of the catalyst (K) Brüggolen C10 (18% of sodium caprolactam in caprolactam, Brüggemann KG, Heilbronn) and 0.2 gram, i.e. 2% by weight, of the activator (V) Brüggolen C20 (80% of caprolactam-capped hexamethylene 1,6-diisocyanate in caprolactam, Brüggemann KG, Heilbronn) in the form of solid at 20° C.

However, the high viscosity of the melt prevented mixing of both the catalyst (K) and the activator (V) in the composition. They remained on the surface of the melt. It was thus impossible to complete the polymerization process.

Example 13

Polymerization of the Lactam Melts in a Calorimeter 1.0 gram of the styrene-butadiene copolymer (Styroflex 2G66) used in examples 1 to 3 and 1.0 gram of a commercially available impact modifier, a polyetheramine (polypropylene glycol triamine, PEA, M=5000 g/mol, PEA T5000, BASF) were dissolved, with stirring, within a period of from 1.5 to 2.5 h at 140° C. in 7.4 g of ε-caprolactam under $N_2$.

The following were then added to the molten mixture: 0.267 g, i.e. 2.67% by weight, of the activator (V) Brüggolen C20 (80% of caprolactam-capped hexamethylene 1,6-diisocyanate in caprolactam, Brüggemann KG, Heilbronn) and 0.4 g, i.e. 4% by weight, of the catalyst (K) Brüggolen C10 (18% of sodium caprolactam in caprolactam, Brüggemann KG, Heilbronn) in the form of solid at 20° C.

Internal temperature was then measured as a function of time over a period of 15 min with the aid of a temperature sensor. The system was then quenched via cooling of the reactor in water (10° C.).

Table 3 shows the properties of the resultant polymer composition in the form of examples 12 and 13.

TABLE 3

| Ex. | Amount of SB copolymer (% by wt.) | PEA (% by wt.) | Monomer (% by wt.) | C10 (% by wt.) | C20 (% by wt.) | Tmax (° C.) | tmax (s) | Density (g/ml) |
|---|---|---|---|---|---|---|---|---|
| 13 | 10% | 10 | 73.33 | 4 | 2.67 | 178.8 | 102 | 1.087 |
| 12 | 10% Bayer | 10 | 73.33 | 4 | 2.67 | 158.3 | 244 | |

The experimental results show that the random vinylaromatic-diene copolymer and the process of the invention give polyamides without any further retardation of reaction rate and without any effect on glass transition temperature (Tg).

Glass fiber mats or aramid fiber mats can be introduced into the random vinylaromatic-diene copolymer composition.

Example 14

Production of a Polyamide Molding with 10% Styroflex 2G66 Content

A polyamide molding was produced by a method based on the RIM process known from the literature in an in-house-designed heatable mold measuring 200×50×2 mm. The mold had connection by way of Teflon tubing to a 1 l round-bottomed glass flask with magnetic stirrer bar, in which the reactive mixture was produced. By applying a slight gauge pressure of $N_2$ to the glass flask, the mixture could be forced into the temperature-controlled mold, which comprised fiber textile.

5.0 g of the styrene-butadiene copolymer (Styroflex 2G66) used in examples 1 to 3, 0.1 g of calcium stearate, and 42.0 g of caprolactam were dissolved in a round-bottomed glass flask under $N_2$ at 140° C. within a period of 1.5 h.

The following were then added: 1.0 g, i.e. 2% by weight, of the activator (V) Brüggolen C20 (80% of caprolactam-capped hexamethylene 1,6-diisocyanate in caprolactam, Brüggemann KG, Heilbronn) in the form of solid at 20° C. and then, after this resultant molten mixture had been degassed for 5 minutes, 2.0 g, i.e. 4% by weight, of the catalyst (K) Brüggolen C10 (18% of sodium caprolactam in caprolactam, Brüggemann KG, Heilbronn) in the form of solid at 20° C. Immediately thereafter, a slight gauge pressure of $N_2$ was applied to the glass flask so as to introduce this reactive mixture into the closed mold, heated to 150° C. and comprising 5 plies of a commercially available fiber textile (Interglas 92125; FK800 size). After 10 min at 150° C. in the mold, the finished molding was removed from the mold without any demolding problems. The product was a polyamide sheet with smooth surface and no discoloration.

The invention claimed is:

1. A lactam composition comprising:
   A) from 3 to 25% by weight (based on the entirety of components A and B) of at least one random vinylaromatic-diene copolymer (A) including at least one block (S) that forms a hard phase and comprises vinylaromatic monomers, and at least one random block (S/B) that forms a soft phase and comprises vinylaromatic monomers and diene monomers,
   wherein the molar mass of the block S/B is from 10,000 to 250,000 g/mol, and the molar mass of the block S (or of the blocks S) is from 5000 to 200,000 g/mol, and the total molar mass of the vinylaromatic-diene copolymer (A) is in the range from 80,000 to 300,000 g/mol,
   B) from 75 to 97% by weight (based on the entirety of components A and B) of at least one lactam component (B),
   C) optionally one or more fillers and/or reinforcing materials (C), and also
   D) optionally one or more additives (Z).

2. The lactam composition according to claim 1, wherein the random vinylaromatic-diene copolymer (A) includes aromatic monomers selected from styrene, alpha-methylstyrene, m-methylstyrene, and/or p-methylstyrene, and diene monomers selected from butadiene, isoprene, and/or 2,3-dimethylbutadiene.

3. The lactam composition according to claim 1, wherein component A) is from 5 to 20% by weight (based on the entirety of components A and B) and component B) is from 80 to 95% by weight (based on the entirety of components A and B) and component B) is ϵ-caprolactam.

4. The lactam composition according to claim 1, wherein the random vinylaromatic-diene copolymer (A) is composed of styrene and butadiene.

5. The lactam composition according to claim 1, wherein the lactam component (B) comprises ϵ-caprolactam, piperidone, pyrrolidone, laurolactam, or a mixture of two or more of ϵ-caprolactam, piperidone, pyrrolidone, and laurolactam.

6. The lactam composition according to claim 1, which comprises an amount of from 5 to 80% by weight (based on the entirety of all of components A, B, C, and Z) of fillers and/or reinforcing materials (C).

7. The lactam composition according to claim 1, which comprises an amount of from 1 to 10% by weight (based on the entirety of all of components A, B, C, and Z) of additives (Z).

8. The lactam composition according to claim 1, with a viscosity at 140° C. of from 10 to 1000 mPas.

9. The lactam composition according to claim 1, with a viscosity at 140° C. of from 10 to 500 mPas.

10. The lactam composition according to claim 3, wherein the random vinylaromatic-diene copolymer (A) is composed of styrene and butadiene.

11. The lactam composition according to claim 10 with a viscosity at 140° C. of from 10 to 500 mPas.

12. A method for producing a lactam melt which comprises forming a melt of the lactam composition according to claim 1.

13. A process for producing polyamides which comprises converting the lactam composition according to claim 1 to molten form, optionally in the presence of a catalyst (K) and/or of an activator (V), and casting the polyamides by activated anionic polymerization.

14. A polyamide item produced from the lactam composition according to claim 1, optionally with use of a catalyst (K) and/or of an activator (V).

15. The polyamide item as claimed in claim 14, wherein in the polyamide item is a cast polyamide item that includes glass fibers.

* * * * *